(12) United States Patent
Reeves et al.

(10) Patent No.: US 6,675,825 B1
(45) Date of Patent: Jan. 13, 2004

(54) LUBRICATED PLUG VALVE

(75) Inventors: Scott A. Reeves, Alice, TX (US); Harry A. Hughes, Beeville, TX (US)

(73) Assignee: Dixie Iron Works, Ltd., Alice, TX (US)

( * ) Notice: Subject to any disclaimer, the term of this patent is extended or adjusted under 35 U.S.C. 154(b) by 40 days.

(21) Appl. No.: 10/222,144

(22) Filed: Aug. 16, 2002

(51) Int. Cl.[7] .................................................. F16K 5/22
(52) U.S. Cl. ............................. 137/246.22; 184/105.3; 251/309; 137/15.24
(58) Field of Search ........................... 137/246, 246.12, 137/246.13, 246.15, 246.16, 246.19, 246.2, 246.22, 15.24; 184/105.3; 251/309

(56) References Cited

U.S. PATENT DOCUMENTS

| | | | |
|---|---|---|---|
| 2,269,887 A | | 1/1942 | Sharp ..................... 137/246.12 |
| 2,488,932 A | * | 11/1949 | Penick ................... 137/246.22 |
| 2,495,596 A | * | 1/1950 | Mueller .................... 137/246.2 |
| 2,591,031 A | | 4/1952 | Volpin ................... 137/246.12 |
| 2,647,720 A | * | 8/1953 | Volpin ................... 137/246.22 |
| 2,685,299 A | * | 8/1954 | Stolberg ................ 137/246.22 |
| 2,954,961 A | * | 10/1960 | Stogner et al. ............. 251/312 |
| 2,999,510 A | | 9/1961 | Volpin ................... 137/246.12 |
| 3,133,722 A | | 5/1964 | McGuire et al. ............ 251/309 |
| 3,346,002 A | * | 10/1967 | Thompson, Jr. et al. ................ 137/246.22 |
| 3,414,002 A | | 12/1968 | Volpin ................... 137/246.12 |
| 4,393,893 A | | 7/1983 | Alexander et al. ...... 137/246.12 |
| 4,450,854 A | | 5/1984 | Alexander et al. ...... 137/246.12 |
| 4,506,696 A | | 3/1985 | von Pechmann ....... 137/246.22 |

* cited by examiner

*Primary Examiner*—George L. Walton

(57) ABSTRACT

A plug valve is provided that may be lubricated while in service. The invention provides a high-pressure valve having a valve body containing a plug allowing bi-directional flow and moveable between an open and closed flow-through position. The valve permitting lubricating and sealing while in-service and in the closed or open position. The lubricating and/or sealing mechanism includes channels formed through the plug to a lubricant groove or grooves formed on the outside surface of the plug between the ends of the fluid conduit through the plug for directing lubricant to the plug-insert or plug-valve body interface when the plug is in the closed position and lubricant to the relief area formed by the insert when the plug is in the open position.

8 Claims, 3 Drawing Sheets

LUBRICATED PLUG VALVE

TECHNICAL FIELD

The present invention relates in general to plug valves utilized in high pressure environments and more specifically to a high pressure valve having a valve body containing a plug allowing bi-directional flow and moveable between an open and closed flow-through position and a lubricating mechanism for introducing lubricant through the plug to a plug/insert interface or a plug/valve body interface regardless of the position of the plug in relation to the valve body.

BACKGROUND

Plug valves have been utilized in industry for many years and are very common in oil field service. Plug valves are commonly employed in heating and treating systems, cementing, fracturing and acidizing applications, blowout preventers and other applications and systems in which high working pressures are encountered. Conventional plug valves comprise a valve body having a fluid transmission conduit formed therethrough connectable to a transmission line, a plug member having a fluid conduit formed therethrough is rotatably disposed within the valve body in a manner that when the plug is in the open position fluid may pass through the plug valve and when in the closed position the plug fluid conduit is offset from the valve body fluid conduit and fluid is prevented from flowing therethrough. It is common for a valve insert to be positioned within the valve body between the valve body and the plug. The valve insert is typically constructed in two halves and the whole forms a conduit port aligned with the fluid conduit of the valve body.

Due to the high pressure and abrasive conditions experienced by plug valves it is necessary to lubricate the valve while in service. It is very detrimental to the safety of operators and to the operations to have a plug valve that cannot be readily opened or closed and/or that has excessive leakage around the valve/body or valve/plug interface.

Prior art plug valves have attempted to provide for frequent and effect lubricating and sealing of plug valves with limited success. A common solution has been to supply a lubricant through the valve body to a plug or split plug member having lubricating grooves formed on the surface. One of many problems with this design is that the lubricating ports from a lubricating reservoir in the valve body must be precisely aligned with grooves formed on the split valve plug. Any offset of these connections results in loss of lubricant and failure to adequately lubricate and seal the plug/valve body interface. Additionally, the utilization of a lubrication valve on the exterior of the valve body is a safety and environmental hazard. Reality shows that plug valves, as other equipment, are subjected to less than tender care. From transportation to installation through service and repair these plug valves are bounced around, hit, and thrown as if an inanimate object. This treatment often results in damage and loss of mechanical integrity of the lubricant insert. This loss of integrity often results in failure of the lubricant insert sending the device under extremely high pressure and high velocity away from the valve. At a minimum this ejection of the lubricant insert results in leakage of fluid from the system and possible shutdown of the system for replacement to, on the more serious side, the lubricant insert impacting or piercing an operator.

Another prior art plug valve as disclosed in U.S. Pat. No. 4,506,696 to van Pechmann utilizes a lubricant/sealant injection insert and lubricating/sealant conduits formed in the plug for communication with lubrication/sealant grooves formed in the valve insert. The design of the '696 device, although complete in itself, does not adequately address the problems associated with plug valves. First, the '696 patent teaches conduits formed through the plug to introduce a lubricant or sealant into a lubricating groove formed on the inside portion of the insert about the fluid passageway formed through the insert, therefore only allowing lubricating and/or sealing the valve when the plug is in the open position. Second, the lubricating grooves of the '696 patent are formed on the inside of the insert and are in the flow path of the fluid when cycling the valve resulting in the lubricant being washed from the groove and wear on the groove resulting in ineffective lubricating and sealing over time. Additionally, the complicated manufacturing and assembly of inserts having internal grooves for lubricating is difficult, costly and often results in an inoperable plug.

It is thus desired to provide a plug valve that permits introduction of a lubricant through the plug into an interface between the plug and valve body or insert when the valve is in service and regardless of the position of the plug relative to the valve body. It is further desired to provide a plug valve that includes a lubricating port that is substantially shielded to protect a lubricating fitting from impact. It is still further desired to provide a lubricated plug valve that does not require additional machining or refurbishment of plug valve inserts.

SUMMARY OF THE INVENTION

In view of the foregoing and other considerations, the present invention relates to an apparatus and method of lubricating a plug valve when the valve is in service and regardless of the position of the plug relative to the valve body.

It is a feature of the present invention to provide a lubricated valve that does not require refurbishment or additional machining of plug valve inserts.

It is a further feature of the present invention to provide a lubricated valve wherein the plug has grooves formed on an outside surface thereof that surrounds the sealing area of the valve insert when the plug is in the closed position.

It is a still further feature of the present invention to provide a plug valve having lubricating port formed in the plug and shielded to protect a lubricating fitting from impact.

Accordingly, a method and apparatus for lubricating a plug valve is provided. The lubricated valve includes a valve body forming a fluid conduit therethrough having opposing end connections connected within a fluid flow line, the valve body forming a valve cavity formed substantially perpendicular to the axis of flow through the body fluid conduit and terminated by cavity openings formed through the valve body; a valve insert forming an insert bore formed therethrough positioned within the valve cavity in a manner such that the insert bore is aligned with the valve fluid conduit and a insert-body sealing interface is formed; a substantially cylindrical plug having a plug fluid conduit formed therethrough, at least one continuous lubricating groove formed on the outside surface of the plug located between the ends of plug fluid conduit, a lug extending from one end of the plug, and a lubricating port formed in the opposing end of the plug in fluid connection with the lubricating groove via a transverse lubricant channel and lateral lubricant channel formed by the plug, the plug being rotatably disposed within the insert with the lug extending through one of the cavity openings and the lubricating port accessible through the other cavity opening and forming a plug-insert interface, the plug moveable between an open position with the plug fluid conduit aligned with the body fluid conduit to a closed position wherein the plug fluid conduit is offset from the body fluid conduit; a securing device having a securing device cavity for maintaining the plug and the insert in the valve body, the securing device disposed in the cavity opening wherein the lubricating port is positioned within the securing device cavity; and means for introducing lubricant through the plug via the plug port and the channels to the lubricating groove positioned at the plug-insert interface when the plug is in the closed position, and the lubricating groove is positioned proximate a relief area formed by the insert when the plug is in the open position.

The lubricated plug valve may include a pair of lubricating grooves the grooves formed on the outside surface of the plug on opposing sides of the plug between the ends of the plug fluid conduit.

A method of lubricating an in-service plug valve includes the steps of: rotating a plug having plug fluid conduit within a valve body and insert to an open position so that said plug conduit is aligned with a valve body fluid conduit permitting fluid to pass through said valve body; introducing a lubricant through the plug to a lubricating groove and into a relief area formed by the insert when the plug is in the open position; rotating the plug to a closed position wherein the plug conduit is offset from the valve body fluid conduit blocking fluid flow through the valve body; and introducing lubricant through the plug to a lubricating groove positioned at a plug-insert interface when the plug is in the closed position.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
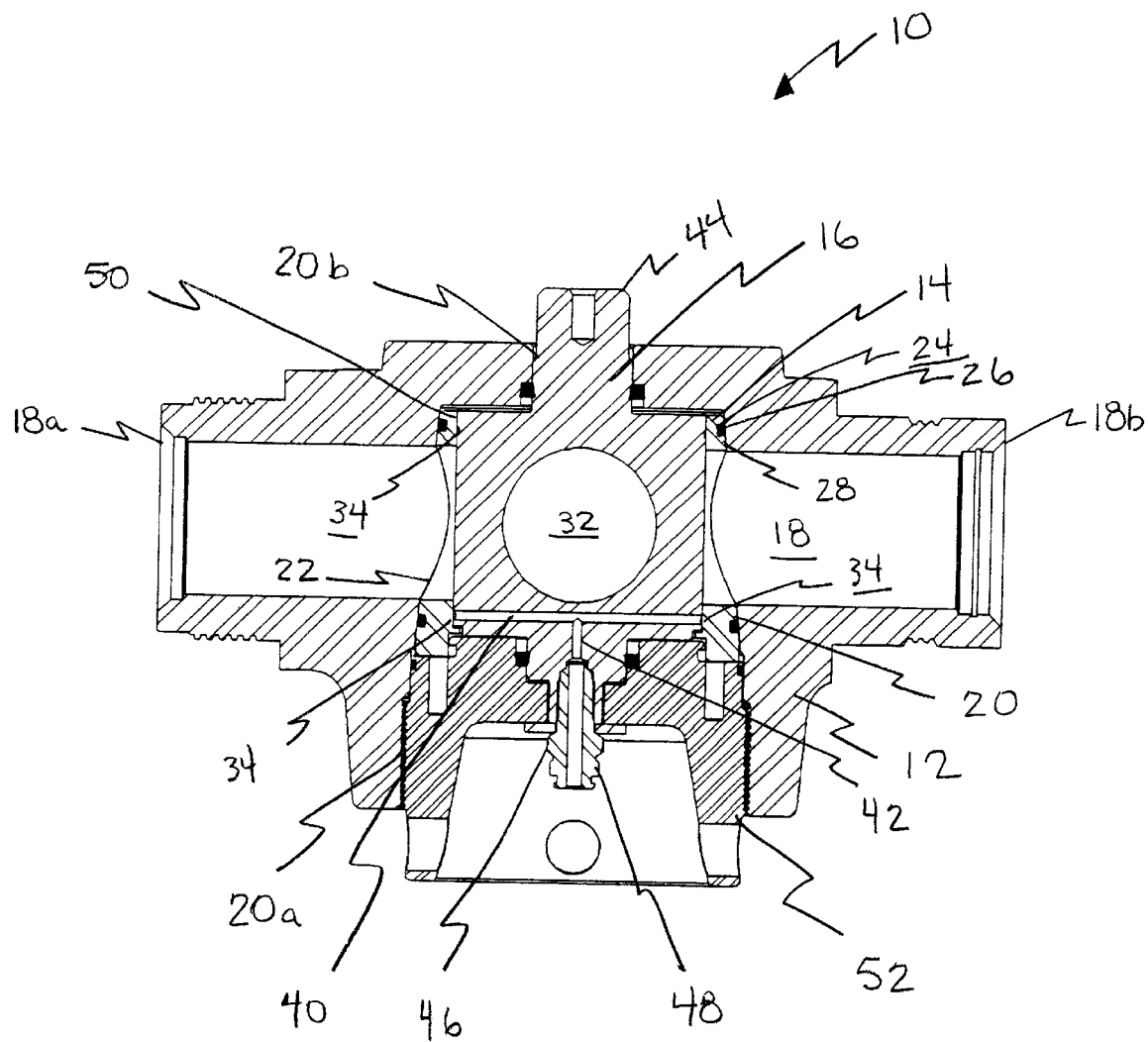
FIG. 1 is a cross-sectional view of the lubricated plug valve of the present invention in the closed position.

Refer now to the drawings wherein depicted elements are not necessarily shown to scale and wherein like or similar elements are designated by the same reference numeral through the several views.

Figure 2:
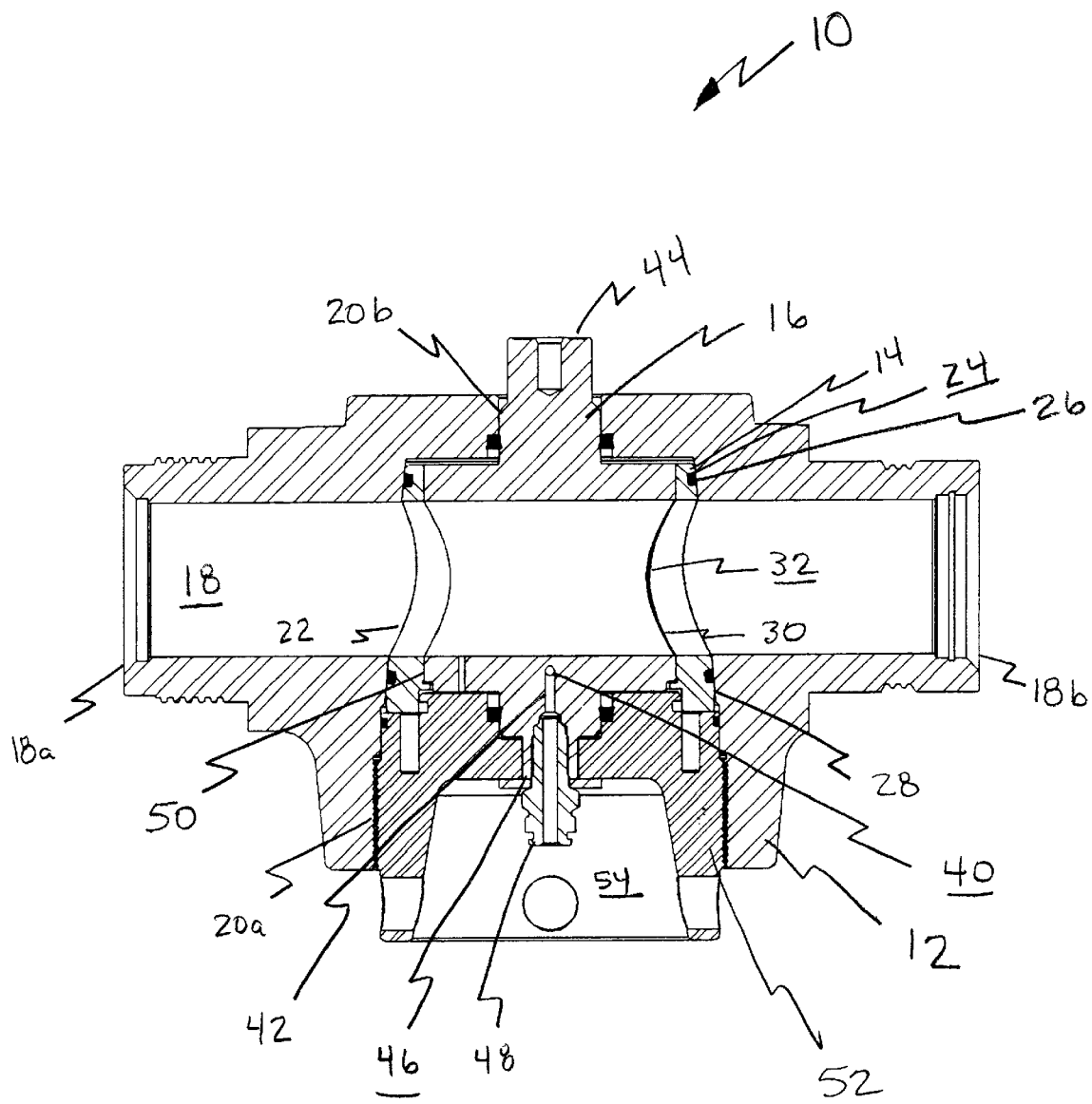
FIG. 2 is a cross-sectional view of the lubricated plug valve of the present invention in the open position.

FIG. 1 a cross-sectional view of the lubricated plug valve of the present invention, generally designated by the numeral 10, shown in the closed position. Lubricated plug valve 10 includes a valve body 12, a valve insert 14, and a plug 16. A cross-sectional view of lubricated plug valve 10 in the closed position is shown in FIG. 2.

Valve body 12 is desirably constructed as a unitary metallic member and individually manufactured for specific pressure ranges and for specific fluids. Valve body 12 includes a body fluid conduit 18 formed therethrough having end connections 18a and 18b for attachment to a flow line such as used for oil field operations. End connections 18a and 18b may be appropriately threaded or flanged for connection within a transmission line. Body 12 forms a valve cavity 20 proximate the center thereof with cavity openings 20a and 20b formed through opposite sides of valve body 12. Valve cavity 20 is formed substantially perpendicular to the axis of flow of fluid through body conduit 18 and terminated at each end by cavity openings 20a and 20b.

Insert 14 includes an insert bore 22 formed therethrough. Insert 14 may be constructed as a unitary or split member. Insert 14 is disposed within valve cavity 20 in a manner such that insert bore 22 is aligned with body conduit 18. It is desirable for insert 14 to include an o-ring groove 24 formed about bore 22 holding an o-ring or other sealing element 26 for additional sealing at the insert-body interface 28. It is desirable that insert 14 not be rotatable within valve body 12. Insert 14 further includes a relief area 30 formed on the interior thereof. Although not shown in the preferred embodiment insert 14 may be excluded from the present invention with appropriate changes made to the device being understood by those skilled in the art.

Figure 3:
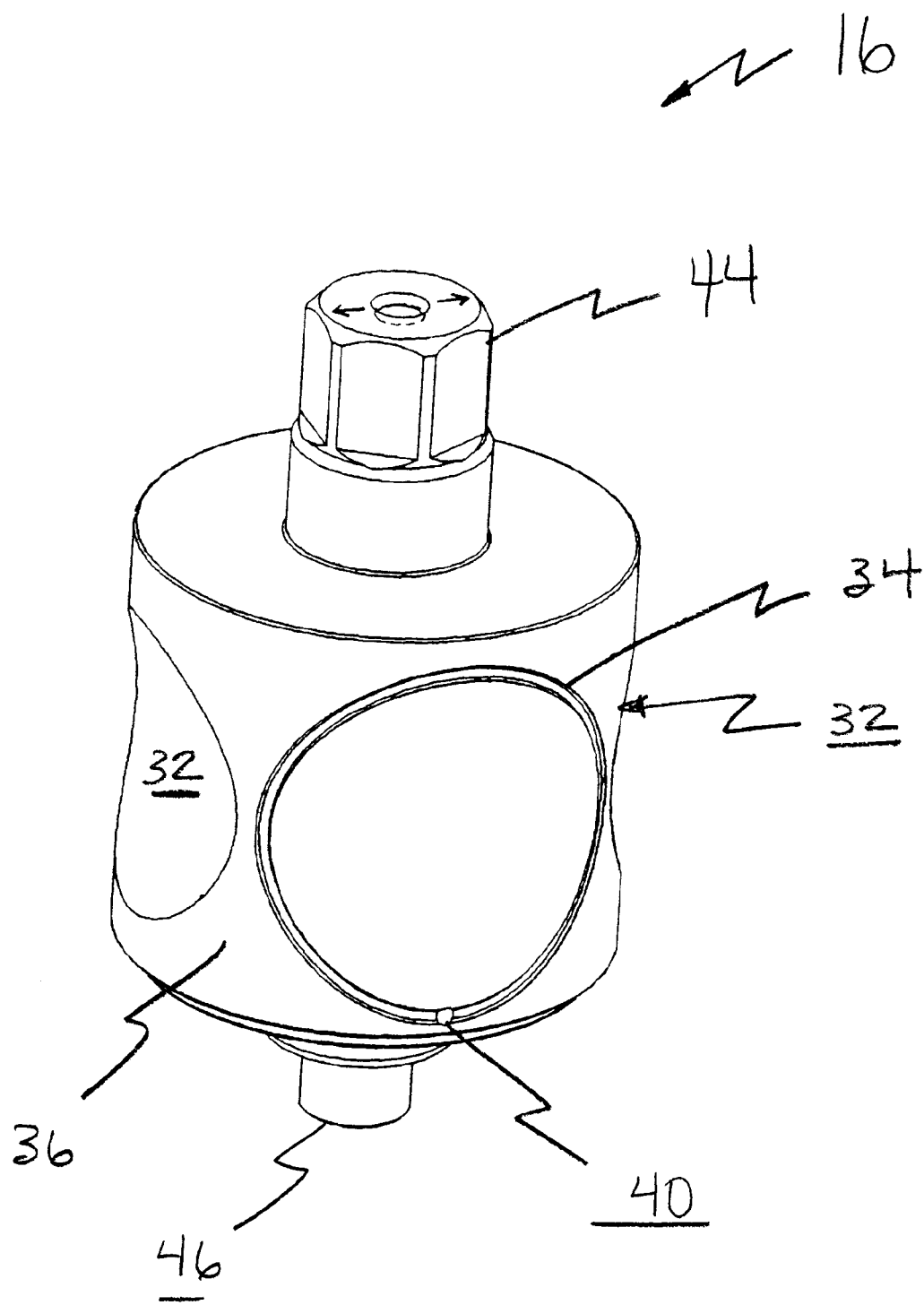
FIG. 3 is an isolated view of the plug of the lubricated plug valve of the present invention.

FIG. 3 is an isolated view of plug 16 of lubricated plug valve 10 of the present invention. Plug 16 is a substantially cylindrical member forming a plug fluid conduit 32 therethrough perpendicular to the axis of plug 16. A separate lubricating groove 34 is formed on the outer surface 36 of plug 16 on opposite sides of plug 16 between the ends of plug fluid conduit 32. Although lubricating grooves 34 are shown as circular it should be recognized that various shapes and profiles of grooves may be utilized in practicing the invention. Lubricating grooves 34 are in fluid connection with a lateral lubricant channel 40 formed through plug 16. It is desired that lubricating groove or grooves 34 be continuous to permit lubrication across a large area from a single lubricant channel. A lug 44 extends from one end plug 16 for operationally rotating plug 16. The opposite end of plug 16 forms a lubricating port 46 in fluid connection with a transverse lubricant channel 42 in fluid connection with lateral lubricant channel 40 (see FIGS. 1 and 2).

With reference to FIGS. 1 through 3, plug 16 is rotatably disposed within insert 14 held in valve body 12 such that a plug-insert interface 50 is formed. Interface 50 is desirably a material to material interface sealing fluid from flowing therebetween. Lug 44 extends through cavity opening 20b allowing an operator to rotate plug 16 to an open position in which plug conduit 32 is aligned with insert bore 22 and valve conduit 18 to a closed position in which plug conduit 32 is offset from insert bore 22 and valve conduit 18. A securing device 52, such as a nut, having a securing device cavity is connected to cavity opening 20a to secure plug insert 14 and plug 16 within valve body cavity 20.

As briefly described with reference to FIG. 3, plug 16 includes a lubricant port 46 that is adapted for holding a lubricant fitting 48 for inserting a lubricant and/or sealant into plug 16 and groove 34. Although not shown lubricant port 46 and or lubricant fitting 48 may have check valves or other means to allow injection of a lubricant into plug 16 but not permit ejection of lubricant from port 46 exterior of valve 10. As shown, port 46 and fitting 48 are disposed within securing device cavity 54 to protect lubricant fitting 48 from impact. Further, FIGS. 1 and 2 clearly show the fluid connection from fitting 48 through lubricant port 46 to transverse lubricant channel 42 through lateral lubricant channel 40 into lubricating groove 34.

Lubricated plug valve 10 is shown in the closed position in FIG. 1. When in the closed position plug fluid conduit 32 is offset from body fluid conduit 18 preventing flow of fluid through conduit 18. Lubricating grooves 34 are positioned along plug-insert interface 50. When lubricated plug valve 10 is in the open position, as shown in FIG. 2, plug conduit 32 is aligned with body fluid conduit 18. Lubricant is injected to lubricating grooves 34 positioned in relief 30 formed by insert 14.

Lubricated plug valve 10 and the method of use is further described in reference to FIGS. 1 through 3. Lubricated plug valve 10 is connected to a transmission line at ends 18a and 18b. Lug 44 is rotated so that plug fluid conduit 32 is aligned with insert bore 22 and body fluid conduit 18 allowing fluid to pass through plug valve 10. In the open position seals are formed at the insert-body interface 28 and the plug-insert interface 50. In order to lubricate plug valve 10 for movement to the closed position or to charge the seals a lubricant is introduced through fitting 48 via a grease gun or the like through transverse channel 42 through lateral channel 40 into lubricating groove 34 and insert relief 30. Lug 44 may be rotated so that plug 16 is moved to the closed position blocking flow through valve 10. When lubricated plug valve 10 is in the closed position, lubricant is injected to lubricating grooves 34 positioned along plug-insert interface 50.

From the foregoing detailed description of specific embodiments of the invention, it should be apparent that a lubricated plug valve and method of use is has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of lubricating an in-service plug valve, said method comprising the steps of:

rotating a plug having plug fluid conduit within a valve body and insert to an open position so that said plug conduit is aligned with a valve body fluid conduit permitting fluid to pass through said valve body;

introducing a lubricant through said plug to at least one lubricating groove formed on the plug and into a relief area formed by said insert when said plug is in the open position;

rotating said plug to a closed position wherein said plug conduit is offset from said valve body fluid conduit blocking fluid flow through said valve body; and introducing lubricant through said plug to said at least one lubricating groove positioned at a plug-insert interface when said plug is in the closed position.

2. The method of claim 1 wherein said at least one lubricating groove is formed on an outer surface of said plug between the ends of said plug fluid conduit.

3. The method of claim 1 wherein at least another lubricating groove is formed on an opposed outer surface of said plug opposite from said at least one lubricating grove positioned between said ends of said plug fluid conduit.

4. The method of claim 1 further including the step of:

securing said plug and said insert in said valve body utilizing a securing device having a securing device cavity encompassing a lubricant port in said plug for introducing lubricant through said plug.

5. The method of claim 2 further including the step of:

securing said plug and said insert in said valve body utilizing a securing device having a securing device cavity encompassing a lubricant port in said plug for introducing lubricant through said plug.

6. The method of claim 3 further including the step of:

securing said plug and said insert in said valve body utilizing a securing device having a securing device cavity encompassing a lubricant port in said plug for introducing lubricant through said plug.

7. A plug valve positioned in a fluid flow line that may be lubricated while in-service, said plug valve comprising:

a valve body forming a fluid conduit therethrough having opposing end connections connected within a fluid flow line, said valve body forming a valve cavity formed substantially perpendicular to the axis of flow through said body fluid conduit and terminated by cavity openings formed through said valve body;

a valve insert forming an insert bore formed therethrough positioned within said valve cavity in a manner such that said insert bore is aligned with said valve fluid conduit and a insert-body sealing interface is formed;

a substantially cylindrical plug having a plug fluid conduit formed therethrough, at least one continuous lubricating groove formed on the outside surface of said plug located between the ends of plug fluid conduit, a lug extending from one end of said plug, and a lubricating port formed in the opposing end of said plug in fluid connection with said lubricating groove via a transverse lubricant channel and lateral lubricant channel formed by said plug, said plug being rotatably disposed within said insert with said lug extending through one of said cavity openings and said lubricating port accessible through the other said cavity opening and forming a plug-insert interface, said plug moveable between an open position with said plug fluid conduit aligned with said body fluid conduit to a closed position wherein said plug fluid conduit is offset from said body fluid conduit;

a securing device having a securing device cavity for maintaining said plug and said insert in said valve body, said securing device disposed in said cavity opening wherein said lubricating port is positioned within said securing device cavity; and means for introducing lubricant through said plug via said plug port and said channels to said lubricating groove positioned at said plug-insert interface when said plug is in the closed position, and said lubricating groove is positioned proximate a relief area formed by said insert when said plug is in the open position.

8. The plug valve of claim 7 wherein said plug valve includes two separate lubricating grooves, said lubricating grooves formed on said outside surface of said plug on opposing sides of said plug between the ends of said plug fluid conduit.

* * * * *